(12) United States Patent
Jackson et al.

(10) Patent No.: US 12,244,131 B2
(45) Date of Patent: Mar. 4, 2025

(54) TENSION STRINGING APPARATUS AND PROCESS

(71) Applicant: TSE International Inc., Shreveport, LA (US)

(72) Inventors: Cody Glenn Jackson, Haughton, LA (US); John Jerry Martin, Castor, LA (US); Andrew Calvin Lackman, Shrevesport, LA (US)

(73) Assignee: TSE INTERNATIONAL INC., Shreveport, LA (US)

( * ) Notice: Subject to any disclaimer, the term of this patent is extended or adjusted under 35 U.S.C. 154(b) by 1395 days.

(21) Appl. No.: 16/814,897

(22) Filed: Mar. 10, 2020

(65) Prior Publication Data

US 2020/0295555 A1 Sep. 17, 2020

Related U.S. Application Data

(60) Provisional application No. 62/919,410, filed on Mar. 12, 2019.

(51) Int. Cl.
*H02G 7/02* (2006.01)
*B66D 1/50* (2006.01)
(Continued)

(52) U.S. Cl.
CPC .................. *H02G 7/02* (2013.01); *H02G 1/04* (2013.01); *H02G 11/02* (2013.01); *H04B 1/38* (2013.01); *B66D 1/50* (2013.01)

(58) Field of Classification Search
CPC . H02G 1/04; H02G 11/02; H02G 7/10; H02G 1/02; H01H 85/0208; B25B 9/02; B25B 27/0035
(Continued)

(56) References Cited

U.S. PATENT DOCUMENTS 8,322,689 B2 * 12/2012 Johnson .................. H02G 1/02
254/134.3 R
2007/0242653 A1 * 10/2007 Yang ...................... H04L 1/0006
370/342
(Continued)

FOREIGN PATENT DOCUMENTS

CN            102288223 A  *  12/2011

*Primary Examiner* — David S Posigian
*Assistant Examiner* — Tyler James McFarland
(74) *Attorney, Agent, or Firm* — WOODLING, KROST AND RUST

(57) ABSTRACT

The process and apparatus for tension stringing a conductor through above-ground supports uses a length of rope affixed to the conductor wound on the tensioning machine and pulled by the puller machine. Each of the first and second stringing apparatuses includes an onboard control system which controls each of the first and second stringing apparatuses in pulling mode or in tensioning mode. Each of the first and second stringing apparatuses includes a motor/regenerative brake or other means of inducing tension into the conductor. Each of the machines includes a wireless transceiver which is hard-wired to said onboard control systems. A first operator resides on the puller machine and selects the machine as a puller machine operating in pulling mode using an onboard control system. An observer resides on the tensioner and selects the second machine to be the tensioner. Each of the wireless transceivers communicates with the other wireless transceiver enabling control of both the machines by the onboard control system of the puller machine.

18 Claims, 9 Drawing Sheets

(51) Int. Cl.
*H02G 1/04* (2006.01)
*H02G 11/02* (2006.01)
*H04B 1/38* (2015.01)

(58) Field of Classification Search
USPC .......................................... 254/134.3, 135.5
See application file for complete search history.

(56) References Cited

U.S. PATENT DOCUMENTS

| | | | | |
|---|---|---|---|---|
| 2009/0267037 | A1* | 10/2009 | Johnson | H02G 1/02 254/134.3 PA |
| 2011/0080283 | A1* | 4/2011 | Schweitzer, III | H02J 13/00017 340/539.1 |
| 2015/0068318 | A1* | 3/2015 | Bardin | G01L 5/047 73/828 |
| 2018/0159305 | A1* | 6/2018 | Barthold | H02G 1/04 |

* cited by examiner

TENSION STRINGING APPARATUS AND PROCESS

This application claims the benefit of and the priority to U.S. Provisional Patent Application Ser. No. 62919410 filed Mar. 12, 2019 which is owned by the Applicant hereof. U.S. Provisional Patent Application Ser. No. 62919410 filed Mar. 12, 2019 is incorporated herein in its entirety by reference hereto. U.S. Provisional Patent Application Ser. No. 62919410 filed Mar. 12, 2019 is also assigned to TSE International, Inc., Shreveport, LA.

U.S. Pat. No. 8,322,689 B2 issued Dec. 4, 2012 to Johnson et al. and assigned to TSE International, Inc., Shreveport, La. is incorporated herein in its entirety by reference hereto. U.S. Pat. No. 9,178,340 B2 issued Nov. 3, 2015 to Johnson et al. and assigned to TSE International, Inc., Shreveport, La. is incorporated herein in its entirety by reference hereto.

BACKGROUND OF THE INVENTION

Field of the Invention

The present invention relates generally to the process used for the installation of electrical or fiber optic conductor. More specifically, the invention relates to a system utilizing wireless communication between a pulling machine (hereinafter sometimes referred to as the puller) and a tensioning machine (hereinafter sometimes referred to as the tensioner) in order to allow the puller to automatically adjust the operational state of the tensioner based on operational parameter values set in the puller by a single operator.

Description of the Related Art

Conventional practice for a tension stringing operation includes a puller, a tensioner, and one skilled operator located on each machine. These operators function to determine the state of operation of the various machines in order to manually conduct the tension stringing operation. The equipment is set up such that the puller is located at one end of a series of structures that are to have conductor installed upon them and the tensioner located at the other end of the series of structures. The puller machine is sometimes referred to herein as the first machine or the pulling machine and the tensioner machine is sometimes referred to as the second machine or tensioning machine. These structures can include wooden poles, metal poles, composite poles, and towers built with similar materials. The tension stringing operation can range from as little as a few hundred feet up to and exceeding 6 miles in range, depending on the particular puller and tensioner setup and the operator's requirements.

The puller is equipped with a pulling rope which is attached to the conductor, located on the tensioner, which is to be installed on the structures. The puller will use the pulling rope to pull the conductor off of the tensioner. The operator controlling the puller will adjust the puller to operate at a certain speed and maximum pulling force as required. The actual force that is required to be applied to the rope and/or conductor (hereinafter sometimes referred to as tension) is controlled by the tensioning machine and varies based on factors comprised of the weight of the conductor being installed, the number of structures, the distance between the two furthest separated structures (hereinafter sometimes referred to as the ruling span), and the desired height of the lowest point on the conductor relative to the surface below the conductor (hereinafter sometimes referred to as sag) as it is installed upon the structures. The tension applied to the rope and/or conductor must not exceed the maximum tension rating of the conductor as published by the conductor manufacturer.

The tensioner must be continuously monitored and its operating parameter values adjusted as necessary to properly execute the tension stringing operation. Conventionally, this adjustment is determined based upon the observations of the operation by the operators controlling the two machines and support personnel during the operation. This creates safety risks due to the response time required to make adjustments of the operating parameter values due to the need to relay information between the puller operator and the tensioner operator. This communication is often performed with the use of two-way radios or cellular telephones. Once the operator on the tensioner has received and interpreted the communication, he must make the adjustments to the tensioner. These adjustments are comprised of manual increases or decreases in brake force being applied to a brake disk style tensioner and adjustment to a higher or lower hydraulic pressure for hydraulic style tensioners. These adjustments take additional time to perform and must be confirmed by the support personnel through additional communications between the operators and the support personnel. These delays can lead to an increase in potential equipment or property damage.

SUMMARY OF THE INVENTION

The subject invention comprises a process and apparatus used for the installation of electrical or fiber optic conductor. The invention includes a wireless communication network operating between the puller and the tensioner in the tension stringing process. This wireless communication network is controlled by a single skilled operator located on the puller (once the machine is up and running) to conduct the tension stringing process without use of a skilled operator on the tensioner. The tensioner will only require an observer that can perform basic functions on the machine, such as power the machine on and off, select the machine as the tensioner, and request an emergency stop of the puller if necessary. The wireless communication system and control system employed on the puller and the tensioner allows the puller and the tensioner to communicate their operating parameter values in real time to each other. This information is in turn used by the puller. This information also allows the skilled operator on the puller to input operating parameter values on the puller. The control system on the puller calculates new values for the tensioner operating parameters and wirelessly communicates new, updated operating parameters to the tensioner. The tensioner then adjusts its operating parameter values automatically in response according to wireless commands from the puller. This provides an advantage over the prior art by changing operating parameter values of the tensioner immediately and accurately. The system increases safety due to the reduction of operator errors during the tension stringing process.

A process for tension stringing a conductor through above-ground supports is disclosed and claimed. Alternatively, the supports may be underground or in a tunnel, chamber or the like. The process includes affixing a length of rope to the conductor, positioning a first stringing apparatus near a first end of the above-ground supports, and positioning a second stringing apparatus near a second end of the above-ground supports. Each of the first and second stringing apparatuses are comprised of Green Machines powered by electric batteries, diesel operated hydraulic machines, or an electric-hydraulic hybrid. Each of the first and second stringing apparatuses includes an onboard control system which controls each of the first and second stringing apparatuses in pulling mode or in tensioning mode. Each of the first and second stringing apparatuses includes a method of generating torque comprising of a motor/regenerative brake. Each of the machines includes a wireless transceiver which is hard-wired to the onboard control systems. A skilled operator is used on the machine which will be the puller or pulling machine. An observer is used on the machine that will be the tensioner or tensioning machine. The skilled operator selects one of the first and second stringing machines as a puller machine operating in pulling mode using the onboard control system of the machine designated as the puller machine. Once the selection of the puller machine is made, the observer on the tensioner machine has to select the machine he/she is on to be the tensioner machine. If the observer on the tensioning machine attempts to select his/her machine as the puller machine and the skilled operator of the puller machine has already selected his/her machine as the puller, the tensioner control system will not accept the selection of the machine as the puller.

Each of the wireless transceivers communicates with the other wireless transceiver enabling control of both of the machines by the onboard control system of the machine designated as the puller machine. Verifying that the wireless communications sent from the transceiver of the puller machine were received by the transceiver of the tensioning machine and the onboard control system of the tensioning machine is necessary to perform safe operation of the machine.

The puller machine in pulling mode is for pulling the conductor off of the tensioning machine and onto the structures. The tensioning machine being in the tensioning mode is for developing the required tension on the conductor while it is being pulled off of the tensioning machine. The process further includes performing a driveline brake check on the puller machine and if applicable, the tensioning machine. The process further includes providing that the driveline brake check on the puller machine and if applicable, the tensioning machine are satisfactory such that there is no rotation of the puller machine reel and the tensioning machine reel. The process further includes inputting a maximum pull value in pounds-force into the onboard puller control system and communicating the desired tension value wirelessly to the tensioning machine.

The process further provides the tensioning machine operating in tensioning mode returning and acknowledging the tension value from the puller machine operating in pulling mode. Note that all wireless signals in the system are verified. Every wireless command sent by the puller machine to the tensioning machine is verified. Next, the process includes setting the tensioning machine motor speed to zero (0.00) and releasing the driveline brakes on the puller machine and the tensioning machine. Next, the process includes selecting the puller machine desired drum speed until the conductor is completely pulled through the supports.

If the conductor is completely pulled through the supports, the process includes simultaneously applying the driveline brakes on the puller machine and the tensioning machine as commanded by the puller machine control system on the puller machine.

The process further includes that the wireless transceiver is a 1 W radio transceiver and that the antenna is a Yagi-Uda type or omnidirectional type. The process further includes use of a Yagi-Uda type or omnidirectional type antenna having a gain of 6 dBm.

The process includes a driveline brake that is an electromechanical brake which prevents rotation of the puller machine reel and the tensioner machine reel. Upon loss or intentional discontinuation of power to the driveline brake, the brake fails in the on position, that is, with the brake applied. The process further requires interposing a bidirectional repeater between the puller machine and the tensioner machine. The bidirectional repeater is comprised of a radio transceiver, an omni-directional radio antenna, and a power supply.

And additionally, the process includes, during application of the driveline brakes, that each-motor controller outputs the maximum programmed amount of motor torque, and, that each motor controller outputs the maximum programmed motor rotations per minute.

The driveline brake is a safety brake while the tensioning motor/regenerative brake holds the tensioning reel and or bullwheels back to create controlled tension in the conductor.

It is an object of the present invention to provide a tension stringing process and apparatus requiring a single skilled operator residing on a puller machine to operate the puller machine and the tensioner machine wherein communication between the machines is performed wirelessly.

It is an object of the present invention to provide a wireless tension stringing process and apparatus wherein a repeater is used to facilitate transmission of signals in rough terrain and/or where there is a line of sight problem.

The conductor stringing apparatus includes a puller machine which pulls a rope affixed to a conductor. The rope has been at least partially guided through the above-ground supports. The rope is secured to a reel on the puller machine and is wound therearound as the conductor is pulled through the supports while it traverses the spans between the supports.

The puller machine comprises: a frame; an onboard control system; a wireless transceiver hard-wired to the onboard control system; a reel about which the pulling rope is wound; an electric motor affixed to the frame and coupled to the reel; a safety brake; and the electric motor expending electrical energy when pulling the conductor in a pulling mode. The conductor stringing apparatus also includes a tensioner machine which tensions out the conductor from a reel on the tensioning apparatus. Tension in the rope and the conductor is created by the puller reel rotation having the rope wound therearound in combination with the application of the regenerative brake (or hydraulic disk brake) to the drive train of the reel of the tensioner machine. Simply put, the puller machine pulls the rope/conductor while the tensioner machine holds-back or resists the paying out of the conductor from the reel of the tensioner machine.

The tensioner machine comprises: a frame; an onboard control system; a wireless transceiver hard-wired to said onboard control system; a reel about which the conductor is wound; an electric motor affixed to the frame and coupled to the reel; said electric motor is a regenerative brake generating electrical energy when tensioning the conductor in a tensioning mode.

The wireless transceiver of the puller machine communicates with the wireless transceiver of the tensioner machine; and, the onboard control system of the puller machine controls the onboard control system of the tensioner machine.

The puller machine includes an electro-mechanical driveline brake which is a safety brake which prevents rotation of the reel of the puller machine when engaged. The tensioner machine includes an electro-mechanical driveline brake which is a safety brake which prevents rotation of the reel of the tensioner machine when engaged.

The process includes an optional feature wherein the safety brake check is not performed and once the prerequisites for establishing the operation of the machine are satisfied the machine can operate the tension stringing process directly. The prerequisites are the setup of the puller machine and the tensioner machine by the respective operators.

The wireless transceiver of the tensioner machine repeats all communications from the wireless transceiver of the puller machine for verification of the communications and their accuracy. One of the important features is that a single skilled operator interfaces with the onboard control system of the puller machine. An observer interfaces with the onboard control system of the tensioner machine.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 5B schematically illustrates setting an initial value for the maximum pull force of the puller machine and wirelessly sending the tension value to the tensioner machine.

FIG. 5C is a continuation of FIG. 5B and schematically illustrates that the driveline brake release on the puller machine and the tensioner machine is made.

FIG. 5E also illustrates repeatedly receiving the command message from the puller and establishing verified wireless communications therebetween. FIG. 5E also schematically illustrates the radio check between the radio (transceiver) and onboard controller of the tensioning machine and the radio (transceiver) and onboard controller of the pulling machine.

DETAILED DESCRIPTION OF THE INVENTION

Apparatus and Initial Process Steps

Figure 1:
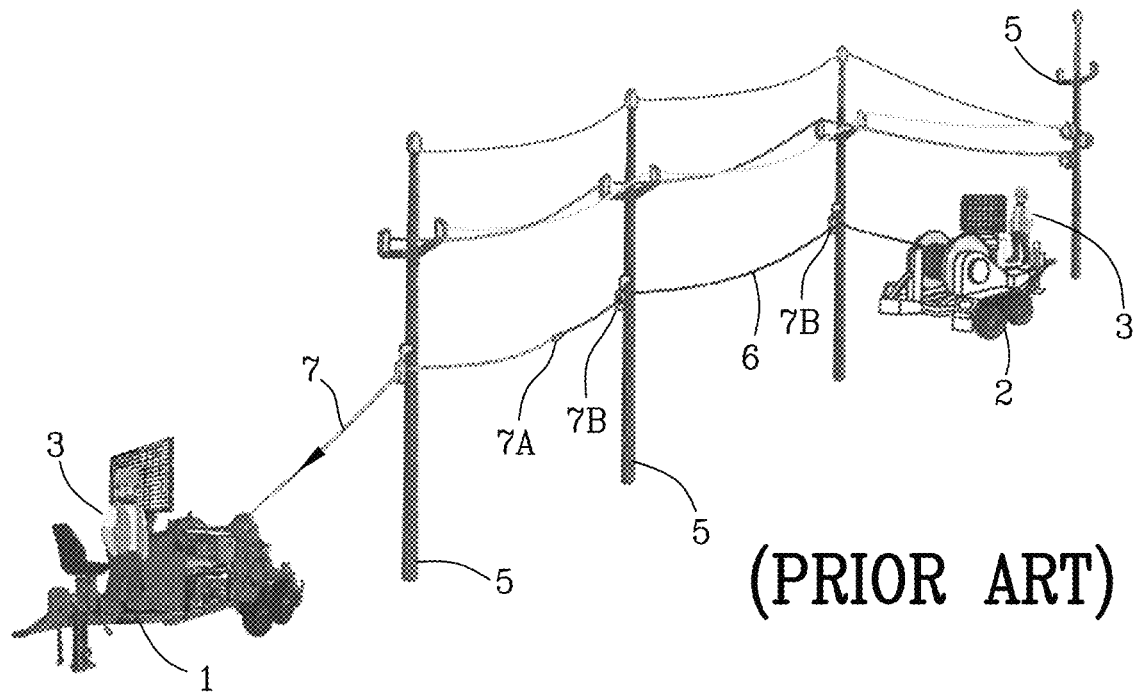
FIG. 1 illustrates a tension stringing operation and the common elements which may be included in such an operation, such as the puller, tensioner, structures, pulling rope, conductor, and two skilled operators.

When referring to the drawings, like numerals indicate like or corresponding parts throughout the views, an exemplary puller is shown at 1 and an exemplary tensioner is shown at 2. In FIGS. 5A-5F, the diamonds are for queries, the parallelograms are for decisions made by the operator, and the rectangles are for functional statements. FIG. 1 illustrates the tension stringing operation and the common elements which may be included in such an operation, such as the puller machine 1, tensioner machine 2, structures 5, pulling rope 7, conductor 6, and two operators 3.

Figure 2:
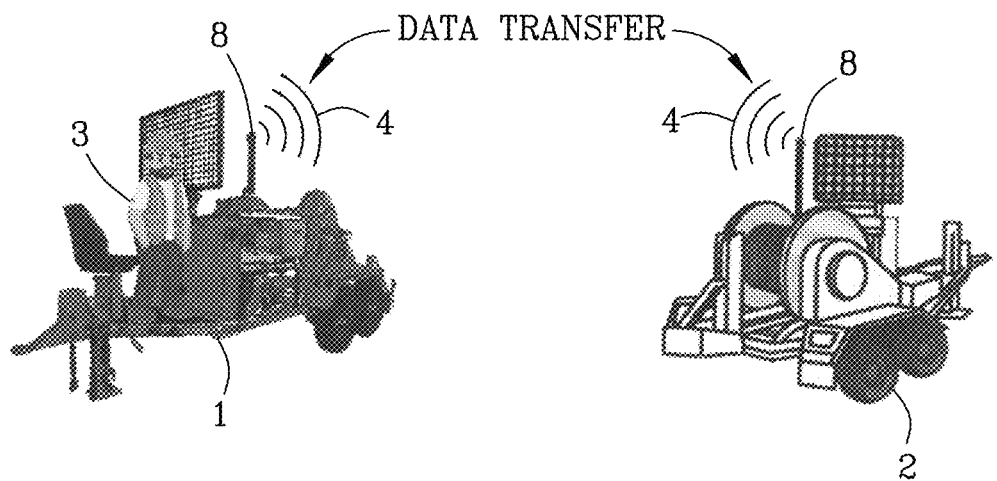
FIG. 2 illustrates a schematic view of the tension stringing process including a puller, tensioner, and the wireless communication network according to the present invention with just one skilled operator.

FIG. 2 illustrates a schematic view of the tension stringing process including a puller machine 1, tensioner machine 2, a single operator 3, and the wireless communication network 4 for communication between the machines. The wireless transceiver is hard-wired to an onboard control system on the puller machine and the onboard control system of the tensioner machine.

Figure 3:
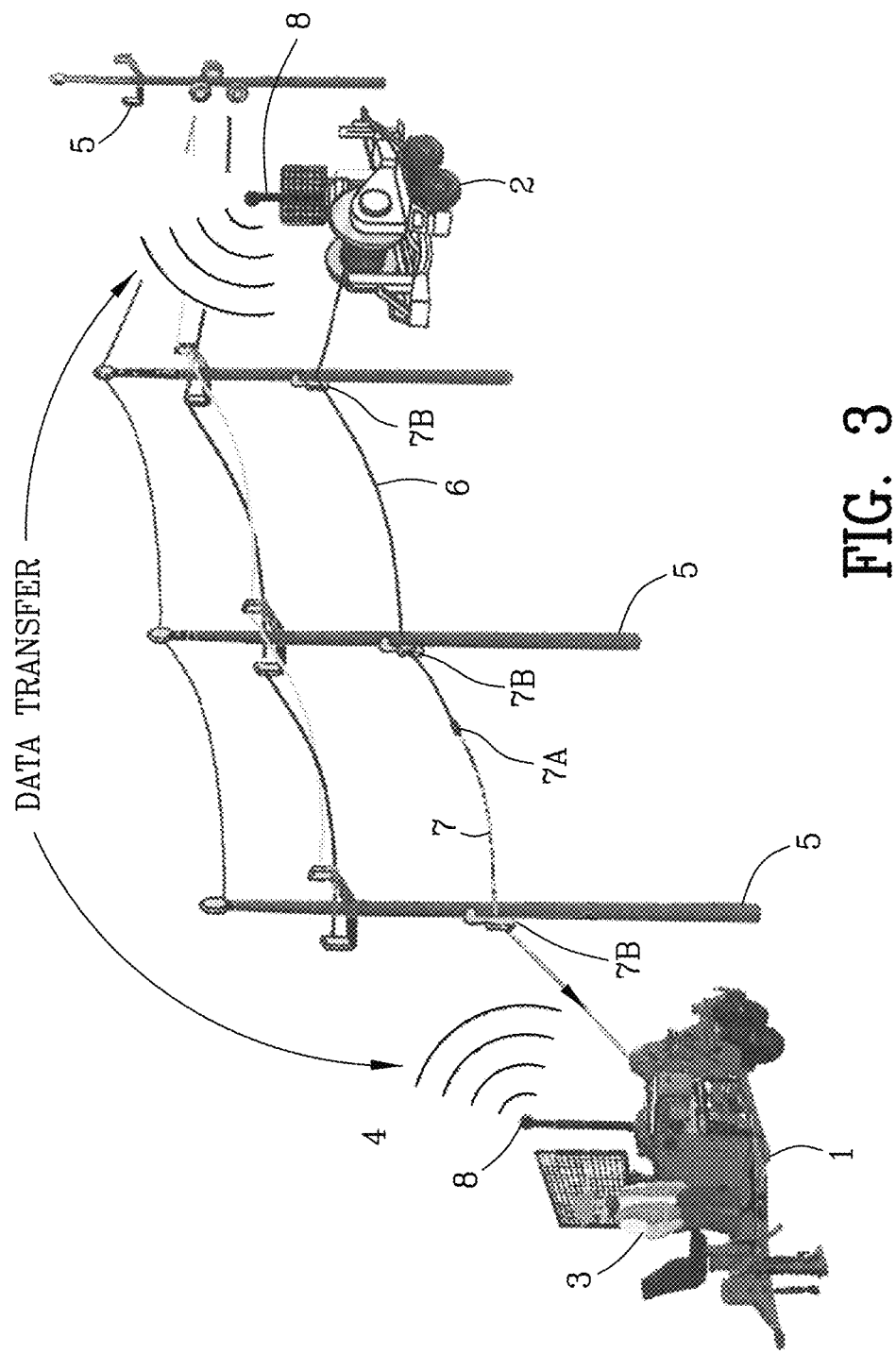
FIG. 3 illustrates an example of the present invention illustrating one skilled operator on the puller machine.

FIG. 3 illustrates an example of the present invention. Referring to FIG. 3, the puller machine 1 is equipped with an onboard control system and an onboard wireless communication system 4, 8. The onboard control system includes an onboard programmable logic controller, for example, a Danfoss MC050 (hereinafter sometimes referred to as the microcontroller) and a LCD display 9, for example, a Danfoss DP700 (hereinafter sometimes referred to as the display) which function to operate the puller 1 based on desired operating parameter values input by the operator 3, including desired speed (hereinafter sometimes referred to as the line speed) and maximum linepull on the pulling rope 7. These values are input by the operator 3 on the puller 1 using a plurality of controls located on a typical control panel, shown in FIG. 4, comprised of a single axis directional control 14, for example, a PQ Controls M115 (hereinafter sometimes referred to as the joystick) equipped with two rocker buttons on the handle, soft buttons on the display 9 which function to adjust parameters shown on the display 9, a single axis joystick 10 for operation of the level wind system, a two position system power switch 13, a battery charge level display 11, and an emergency stop button 12. In addition to a typical control panel, the puller 1 and tensioner 2 are each equipped with an apparatus which when paired with the microcontrollers located on the puller 1 and the tensioner 2 respectively allows for the formation of a wireless communication network 4 between the two machines. Each onboard controller is hard-wired to the antenna. The onboard control system may be operated manually from each machine (puller or tensioner) if so desired.

Wireless Communication

Figure 5A:
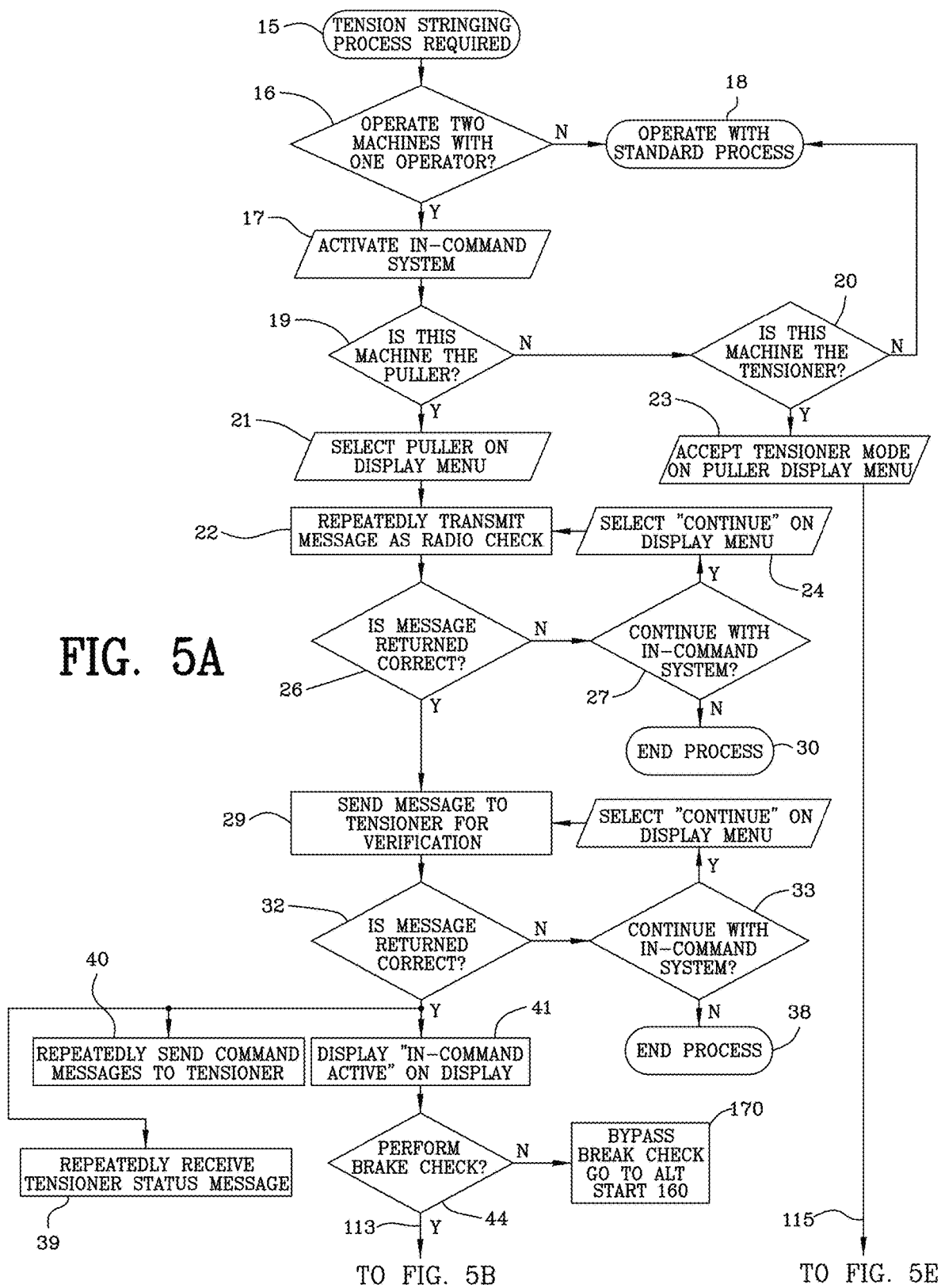
FIG. 5A schematically illustrates a portion of the process flow diagram wherein: selection of one of the machines as the puller machine is made on the puller machine; selection of the other of the machines as the tensioner machine is made on the tensioner machine; and, communication is established and verified through radio checks between the stringing apparatuses (puller and tensioning machines).

FIG. 5A schematically illustrates a portion of the process flow diagram wherein: selection of one of the machines as the puller machine 1 is made; selection of the other of the machines as the tensioner machine 2 is made after selection of the puller machine is made; and, communication is established and verified through radio checks between the stringing apparatuses (puller and tensioning machines). FIG. 5E also schematically illustrates the radio check between the radio (transceiver 4) and onboard controller of the tensioning machine 2 and the radio (transceiver 4) and onboard controller of the pulling machine 1.

Figure 5B:
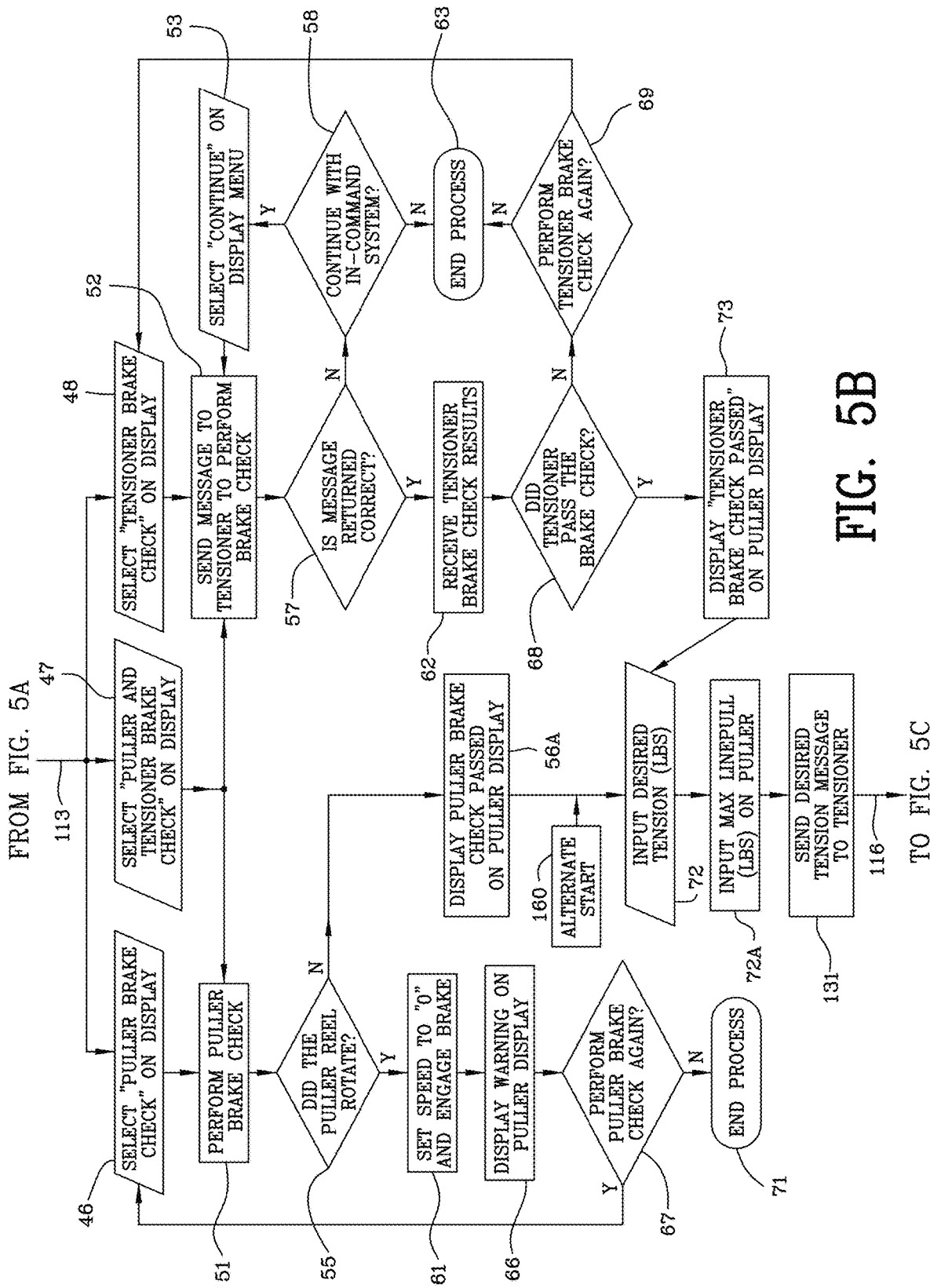
FIG. 5B schematically illustrates a portion of the process flow diagram wherein: the safety brake check (driveline brake check) on both the puller machine and the safety brake check (driveline brake check) of the tensioner machine is made.
Figure 5C:
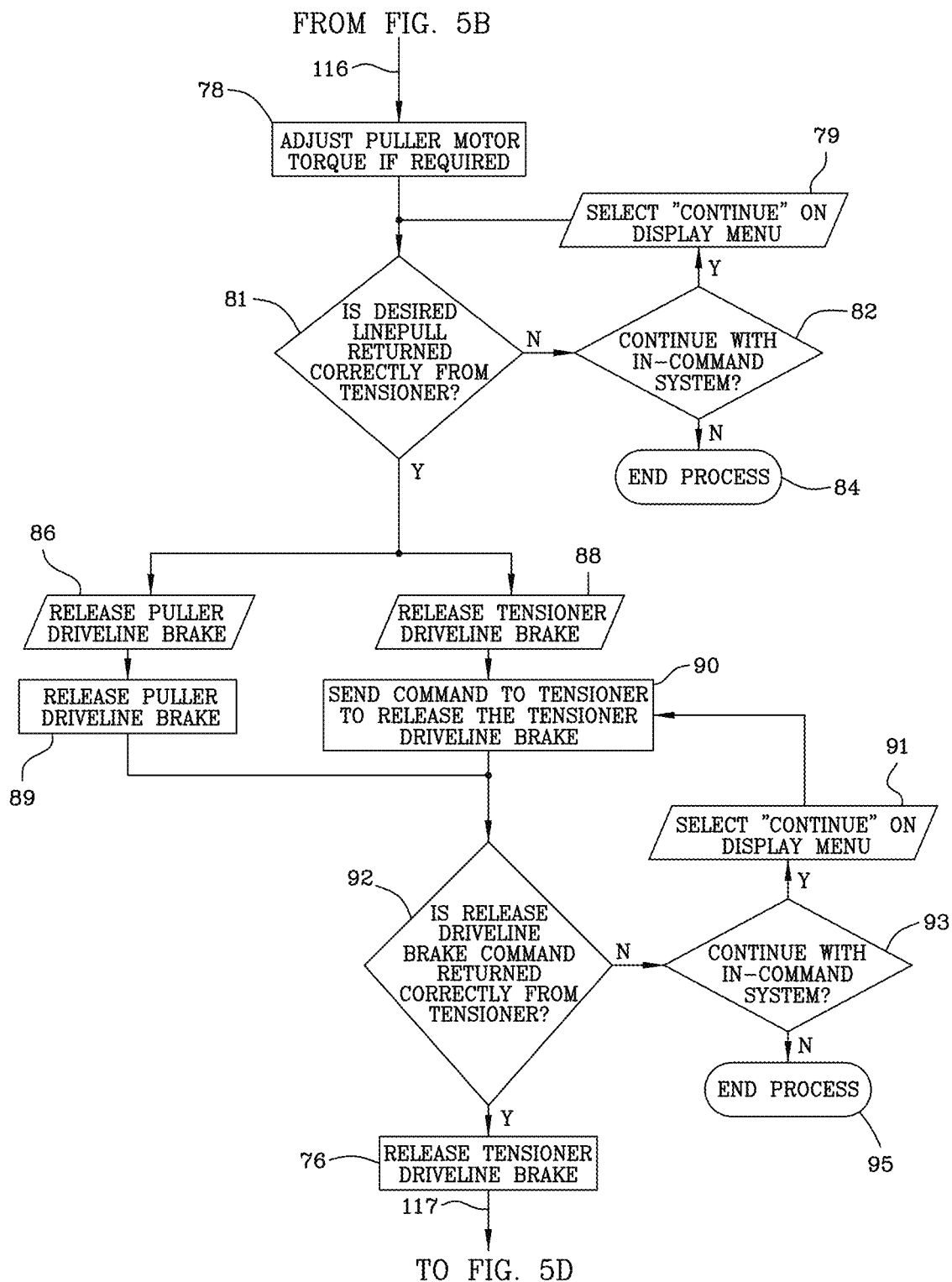
FIG. 5C schematically illustrates that the desired tension value was received by the tensioner.

FIG. 5B schematically illustrates a portion of the process flow diagram wherein: the safety brake check (driveline brake check) on both the puller machine 1 and the safety brake check (driveline brake check) of the tensioner machine 2 is made. FIG. 5B schematically illustrates setting an initial value for the line pull force 72 of the puller machine 1 and wirelessly sending the value to the tensioner machine 2. FIG. 5C schematically illustrates that the desired line pull value was received by the tensioner. FIG. 5C is a continuation of FIG. 5B and schematically illustrates that the driveline brake release on the puller machine 1 and the tensioner machine 2 is made.

Figure 5D:
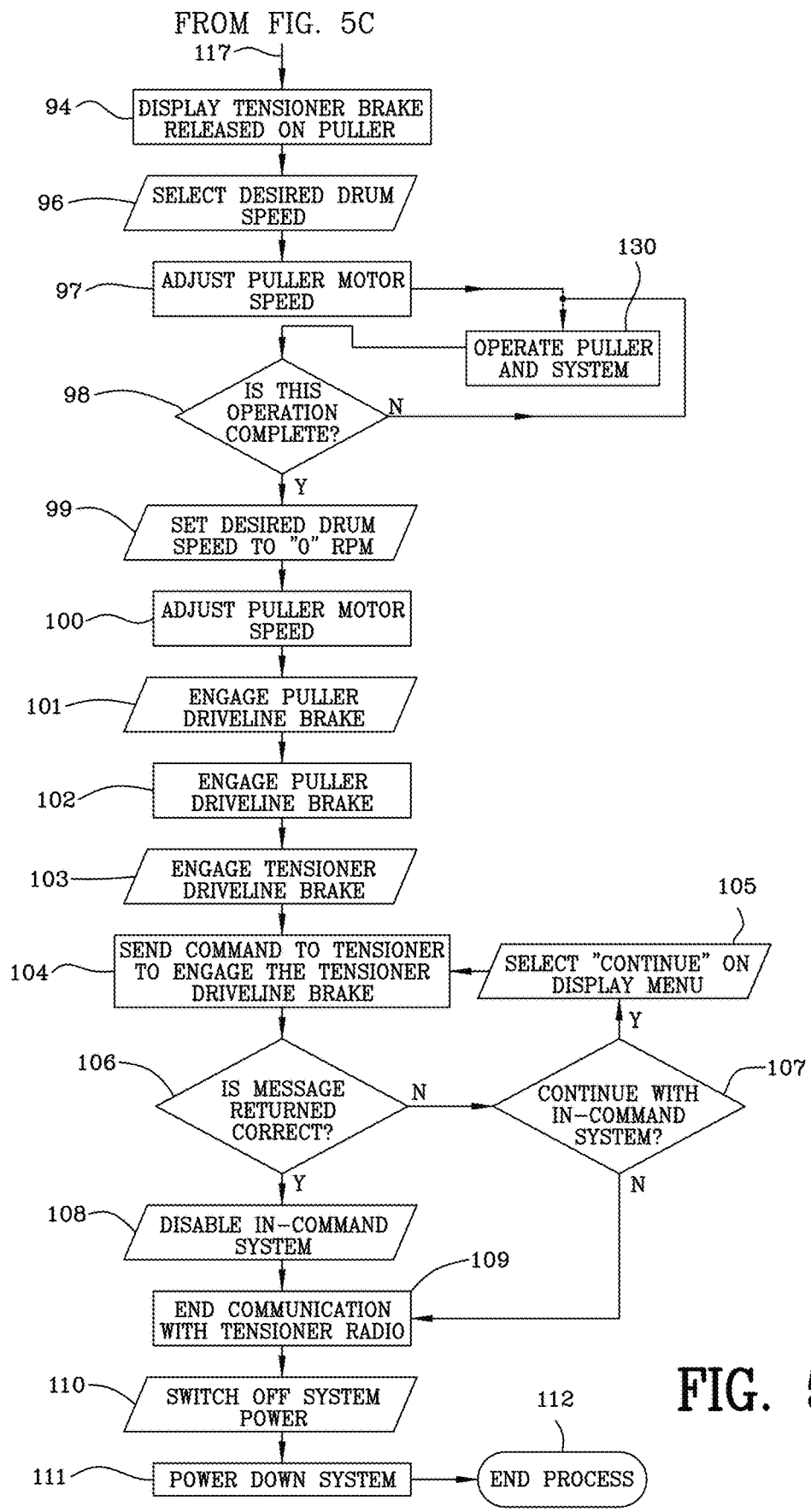
FIG. 5D illustrates a portion of the process flow diagram which establishes the line pull operation until the process is complete or stopped.
Figure 5E:
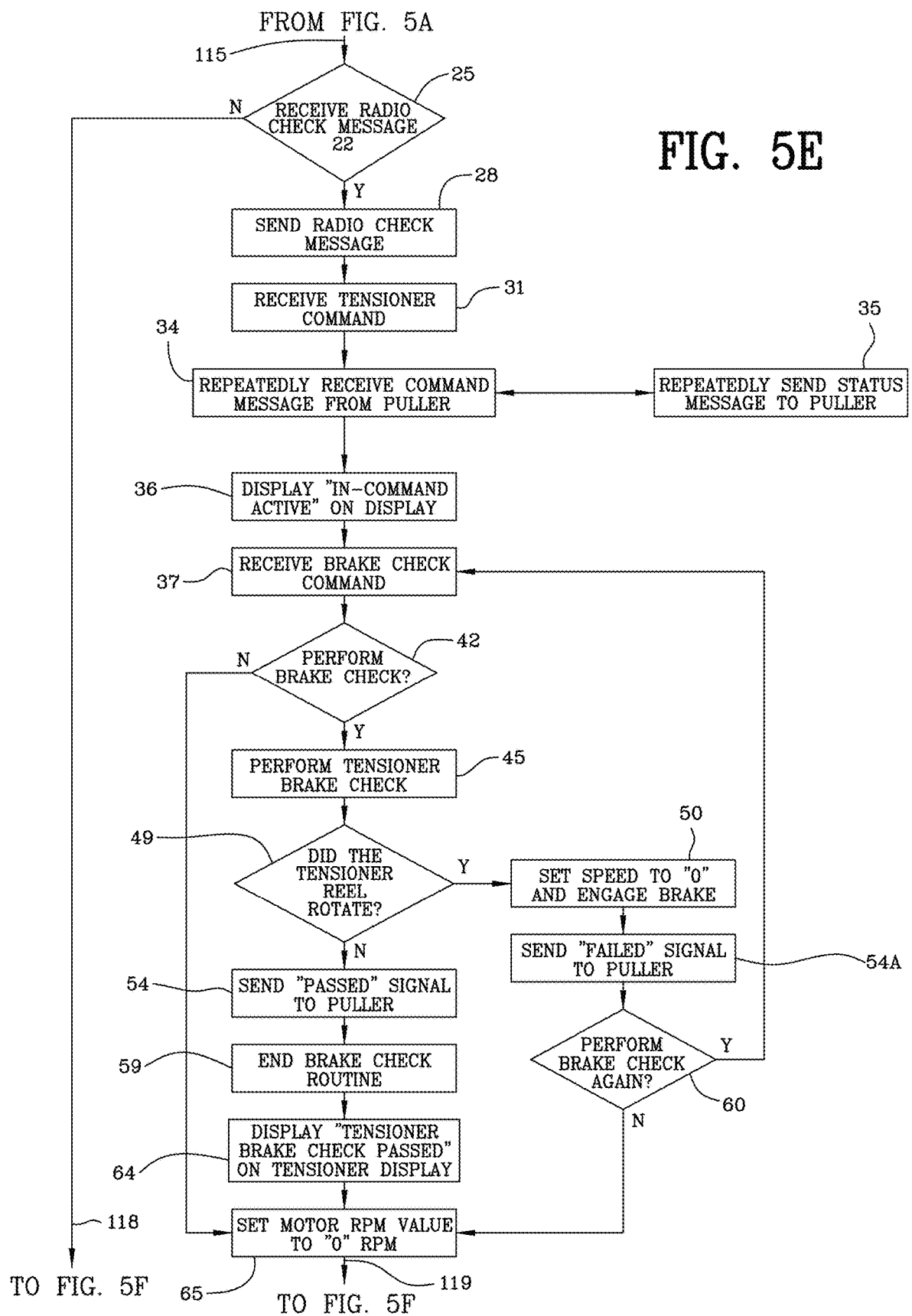
FIG. 5E illustrates a portion of the process flow diagram which establishes a portion of the driveline brake check for the tensioner which relates to the driveline brake check in FIGS. 5B and 5C.

FIG. 5D illustrates a portion of the process flow diagram which establishes the line pull operation 130 until the process is complete or stopped 98.

FIG. 5E illustrates a portion of the process flow diagram which establishes a portion of the driveline brake check for the tensioner which relates to the driveline brake check in FIGS. 5B and 5C. FIG. 5E also illustrates receiving the command 31 instructing the machine to operate as the tensioner 1 and establishing verified 26 wireless communications therebetween (FIG. 5A).

Figure 5F:
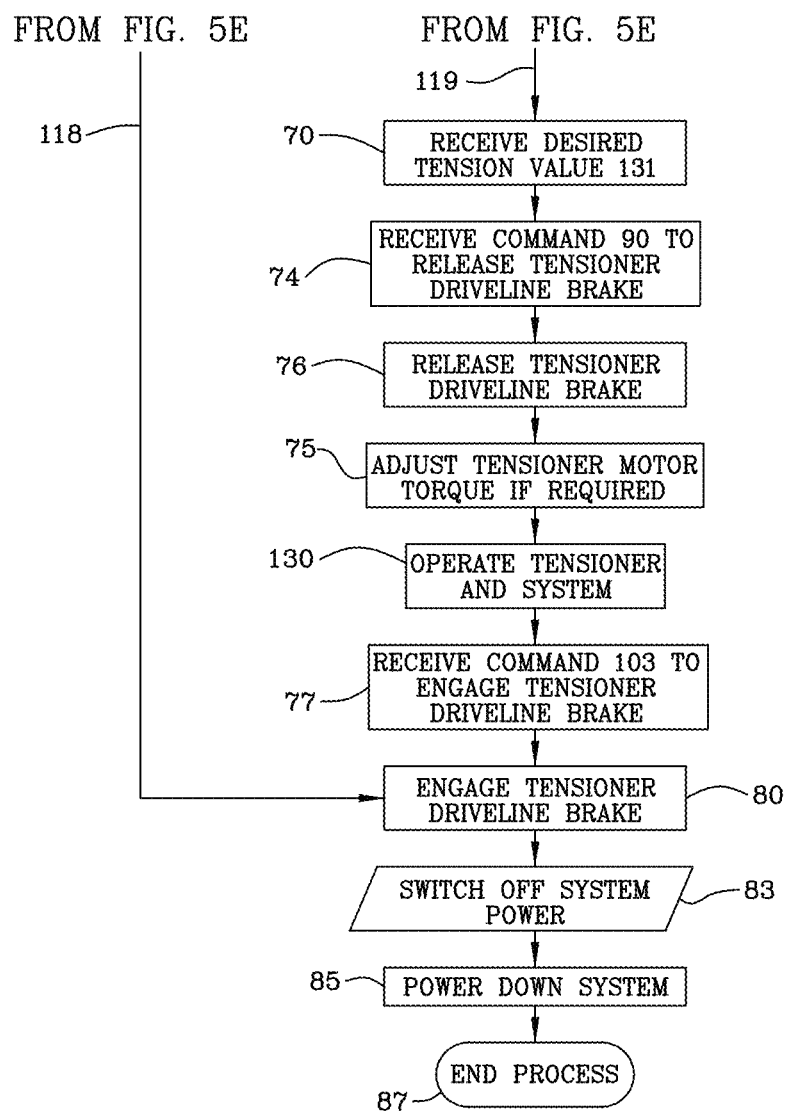
FIG. 5F is a continuation of FIG. 5E and illustrates the receipt by the tensioning machine of the required tension force as commanded by the puller machine.

FIG. 5F is a continuation of FIG. 5E and illustrates the receipt 70 by the tensioning machine of the required line pull force as commanded 131 by the puller machine (FIG. 5B).

Referring to FIGS. 2, 5A, 5B, 5C, 5D, 5E, and 5F, the apparatus which forms the wireless communication network 4 is comprised of a 1 W radio transceiver on both the puller 1 and the tensioner 2, and a radio antenna 8, for example, a Yagi-Uda type or omnidirectional type antenna on both the puller 1 and the tensioner 2. The radio used in the wireless communication network 4 operates without the requirement of a license in accordance with the rules and regulations set forth under Title 47 of the Code of Federal Regulations (CFR) in the Federal Communications Commission (FCC) part 15 (hereinafter sometimes referred to as 47 CFR part 15). The radio used is direct FM controlled operating on an unlicensed ISM (Industrial, Scientific and Medical) band with a frequency in the range of 902-928 MHz. In order to achieve the maximum range and obstacle penetration capability while operating in this ISM band, a 1-watt (30 dBm) (decibels milliwatts) transmission is paired with a 6 dBm gain radio antenna. Provided that small losses to gain due to equipment comprised of the radio antenna cable and fittings are present, the total effective isotropic radiated power (hereinafter sometimes referred to as EIRP) is less than or equal to 36 dBm in accordance with 47 CFR part 15 rules.

Both the puller and the tensioner are identically equipped and include an onboard control system (a programmable logic controller), a wireless communication system, a frame and supporting wheels and tires, a reel, an electric motor controller, an electric motor/regenerative brake, and an electro-mechanical driveline brake. The electro-mechanical driveline brake is a safety feature and prevents rotation of the reel when it is applied.

Whichever machine is selected to be the puller is the dominant machine and the control system of the dominant machine controls the other machine (tensioner) and interacts with the onboard control system of the tensioner. Either machine can be selected as the puller machine as the machines are identical. Only one skilled operator is required on the puller machine after the puller machine acquires jurisdiction and control with respect to the tensioner machine. The tensioner requires an observer to designate/select it as the tensioner machine following selection of the other machine as the puller machine. The tensioner requires an observer to energize and deenergize the tensioner machine.

All operator actions are on the puller except designation/selection of the tensioning machine as the tensioning machine.

The transceiver will encode data sent to it from the microcontroller over a controller area network (hereinafter sometimes referred to as the CAN) on the transmitting machine (puller 1 or tensioner 2) and then broadcast the message to the transceiver on the receiving machine. The transceiver will decode the message into a message of the same CAN format before the transceiver of the sending machine encoded the data. This message is then sent across the CAN bus to the microcontroller on the receiving machine (puller 1 or tensioner 2). The control system and the transceiver are powered by the onboard 12-volt DC electrical power supply of the puller 1 and the tensioner 2.

The tensioner 2 is also equipped with a typical control panel, an onboard control system, and an onboard wireless communication system 4. This enables a member of the operational crew to manually operate the tensioner 2 if desired. This also allows the tensioner 2 to be powered up and prepared for remote control via the wireless communication network 4 with the puller 1. This control panel includes an emergency stop button 12 that can be pressed in the event of an emergency situation to request the halt of operation of both the puller 1 and the tensioner 2. The puller 1 will activate this emergency halt state automatically if the wireless communication network 4 fails and the puller 1 is no longer in communication with the tensioner 2 for a prescribed duration of time.

All wireless communications between the machines are verified to ensure safe operation of the system.

The wireless communication network 4 functions to transmit data gathered from a plurality of sensors located on both the puller 1 and tensioner 2 to the microcontrollers located on each machine. These various sensors include speed sensors, electrical current sensors, and voltage sensors. The speed is used to determine the speed of an electric motor that is used for propelling the drivetrain of the puller 1 and the tensioner 2. The current and voltage sensors are used to determine the torque at which the electric motor is operating. A rotary pulse generator is located such that the pulling rope 7 on the puller 1 or conductor 6 on the tensioner 2 respectively will rotate the pulse generator as the pulling rope 7 or conductor 6 are pulled onto or paid off of the respective machine. This rotation provides a frequency signal which is used with data from the driveline speed sensor to calculate the radius of the outer most layer of pulling rope 7 or conductor 6 on the respective reel.

This data is used by the microcontroller, in conjunction with a desired operational parameter value input by the operator 3 located on the puller 1, to compute a required corresponding operational parameter value for the tensioner 2. This value is transmitted across the wireless communication network 4 from the puller 1 to the tensioner 2. The tensioner 2 will then adjust its current state of operation based on this transmitted information and its own array of sensors that are similar to the sensors on the puller 1, until the desired operational parameter values are met on the tensioner 2.

In order for a single skilled operator 3 to control both the puller 1 and tensioner 2 from the puller 1 control panel, the wireless communication network 4 must be used, as indicated by the query at 16 (FIG. 5A). To use this wireless communication network 4 (activate In-Command system), the puller 1 will be located at one end of a series of structures 5 that are to have conductor 6 installed upon them, and the tensioner 2 will be located at the opposite end of the series of structures 5. The pulling rope 7 on the puller 1 will be attached 7A to the conductor 6. See FIGS. 1, 3A. The operator 3 will begin the tension stringing operation by enabling the wireless communication network 4 in order for the puller 1 to gain control over the tensioner 2. See FIG. 2. To enable the wireless communication network 4, the operator 3 must select the option to activate 17 (FIG. 5A) the In-Command wireless communication network 4 by pressing the associated button on the display 9 of the puller 1.

Repeater

Figure 4A:
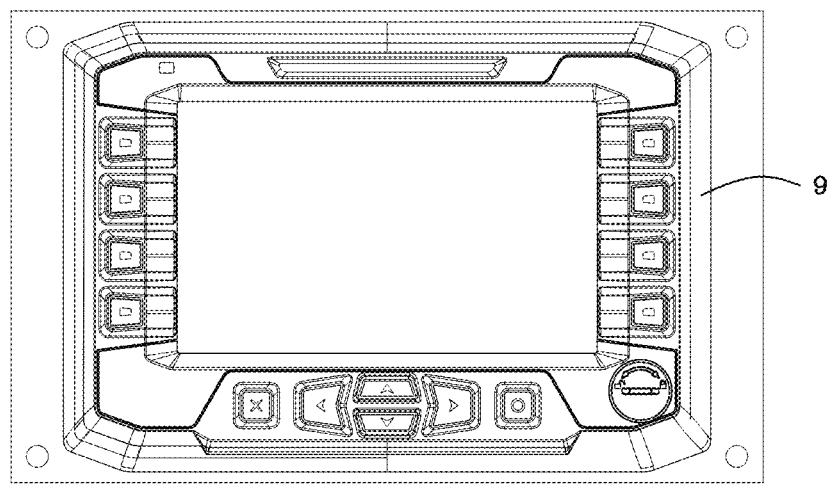
FIG. 4A illustrates a front view of the display.
Figure 4:
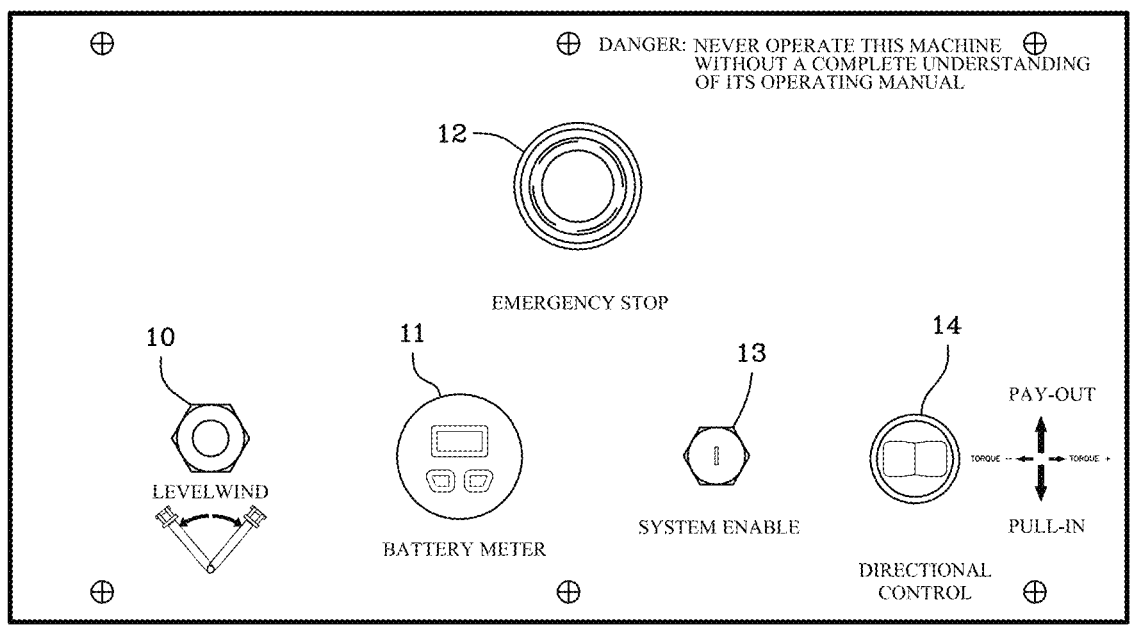
FIG. 4 illustrates a typical onboard control panel arrangement of the present invention.
Figure 4B:
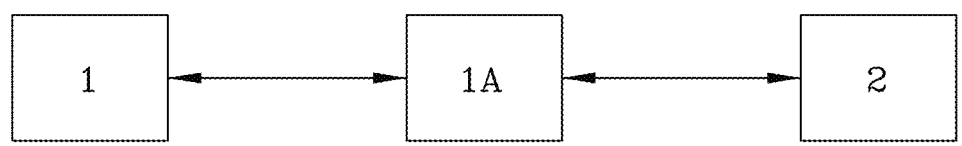
FIG. 4B is a diagram of the repeater interposed between the puller machine and the tensioner machine.

Referring to FIG. 4B, If the tension stringing operation is to extend beyond the range of the wireless communication network 4, or if there is some obstruction between the puller 1 and tensioner 2 that inhibits the wireless communication, for example, a large building, hill, or forested area, the operator 3 may choose to deploy a bidirectional radio signal repeater 1A (hereinafter sometimes referred to as a repeater). The bidirectional repeater 1A is a self-contained unit comprised of a radio transceiver, an omni-directional radio antenna, and a power supply. The bidirectional repeater 1A is placed between the puller machine 1 and the tensioner machine 2 and functions to receive incoming signals from the transmitting system (either the puller or the tensioner) and relay them to the receiving system in order to extend overall range and to allow communications around obstacles which may otherwise prohibit communications. The quantity of repeaters deployed is not limited to a single unit. Each additional repeater 1A will extend the system range by relaying messages between repeaters until the messages are delivered to the receiving unit.

After the operator 3 activates the wireless communication network 4 (activate In-Command system), the program will display a prompt to the operator 3 with a menu to select whether the machine the operator 3 is on is to be the puller 1 or the tensioner 2, shown at queries 19 and 20, respectively (FIG. 5A). Both queries "is this machine the puller?" and "is this machine the tensioner?" will appear on the display 9 of each machine. Either machine can be selected as the puller or the tensioner. The operators, of course, know which machine is which, that is, the tensioner has the conductor wound around the reel and the puller just has the rope wound around the reel of the puller.

A skilled operator is used on the machine which is the puller or pulling machine. An observer is used on the machine that is the tensioner or tensioning machine. The skilled operator selects 21 one of the first and second stringing machines as a puller machine operating in pulling mode using the onboard control system of the machine designated as the puller machine. Once the selection of the puller machine is made the observer on the tensioner machine has to select 23 the machine he/she is on to be the tensioner machine. If the observer on the tensioning machine attempts to select his/her machine as the puller machine and the skilled operator of the puller machine has already selected his/her machine as the puller, the tensioner control system will not accept the selection of the machine as the puller. Each of the wireless transceivers are communicating with the other wireless transceiver enabling control of both of the machines by the onboard control system of the machine designated as the puller machine. Verifying that the wireless communications sent from the transceiver of the puller machine were received by the transceiver of the tensioning machine and the onboard control system of the tensioning machine is necessary to perform safe operation of the machine. Verification of wireless communications between the machines is verified continuously throughout the operation of the system.

The puller machine in pulling mode is for pulling the conductor off of the tensioning machine and onto the structures. The tensioning machine being in the tensioning mode is for developing the required tension on the conductor while it is being pulled off of the tensioning machine.

If the machine is to be the puller 1 during the tension stringing process, the operator 3 uses the buttons on the display 9 to select the puller option, shown at 21. If the machine is to be the tensioner 2 during the tension stringing process, shown at query 20, the observer will use the buttons on the display 9 to select the tensioner option, shown at 23 (FIG. 5A).

If neither puller nor tensioner options are selected, the machine will not enable the wireless communication network 4 and will continue to function with standard operating procedures requiring one skilled operator 3 located on each machine for controlling the machines independently, shown at 18 (FIG. 5A).

Referring to FIGS. 5A and 5E, once the puller 1 and the tensioner 2 have been identified by the respective operators 3, the operator 3 on the puller machine prepares for the beginning of the tension stringing operation. Referring to FIG. 5A, the puller 1 will begin by generating a radio check signal as a CAN message. This message is sent to the wireless communication network 4 and transmitted to the tensioner 2, shown at 22. The tensioner 2 will receive this message, shown at 25, and relay it back to the puller 1, shown at 28 (FIG. 5E). The puller 1 will then receive this relayed message from the tensioner 2 and compare the value to the original CAN message, shown at 26 (FIG. 5A). If this message is not received correctly, the operator 3 will be required to choose between ending the process, shown at 30 (FIG. 5A), or selecting to continue attempting to transmit and correctly receive the radio check message, shown at 24 (FIG. 5A). This functions as a handshake to verify that the wireless communication network 4 is functioning properly and is sending and receiving data with the proper encryption. Messages will be continuously transmitted and verified in this manner during use of the apparatus and performance of the process. If the message is verified as correct once it is relayed back from the tensioner 2, the puller 1 will assume command over the functionality of the tensioner 2, shown at 29, and will transmit a command message over the wireless communication network 4 to the tensioner 2 indicating such. See FIG. 5A.

Still referring to FIG. 5A, once the puller 1 has transmitted the command message 29 to the tensioner 2 indicating that the puller 1 is in command of the tensioner 2, the tensioner 2 will relay this message back to the puller 1 using the wireless communication network 4, shown at 35 (FIG. 5E). The puller 1 will receive this relayed message and verify that the tensioner 2 has received the correct message by comparing it to the original message that the puller 1 produced, shown at 32 (FIG. 5A). Once this message has been verified as correct, the puller 1 and the tensioner 2 will display "In-Command Active" on their displays 9, shown at 41 (FIG. 5A) and 36 (FIG. 5E) respectively.

Safety Brake Check

Referring to FIGS. 5B and 5C and others, the operator 3 begins the tension stringing operation by performing a safety check on both the puller 1 and the tensioner 2 in a process called a brake check, shown at 44 (FIG. 5A). The operator 3 selects to activate the brake check process on either the puller 1, the tensioner 2, or both the puller and the tensioner by using the buttons located on the puller 1 display 9, shown at 46, 47, and 48 respectively.

If the tensioner option is selected in FIG. 5B, 48, or if both the puller and the tensioner are selected FIG. 5B, 47, the tensioner 2 will automatically engage its driveline brake, adjust its motor controller to output the programmed amount of motor torque, and adjust its motor controller to output the programmed motor rpm, shown at 45 (FIG. 5E).

When the puller 1 option 46 is selected, or if both the puller and the tensioner are selected FIG. 5B, 47, the puller 1 will simultaneously perform the same routine with its own driveline brake and motor controller, shown at 51 (FIG. 5B). By same routine it is meant that the puller will adjusts its motor controller to output the programmed amount of motor torque, and adjust its motor controller to output the programmed motor rpm, shown at 51 (FIG. 5B). This simulates a maximum line tension situation where the driveline brake would be required to prevent drum rotation should the operator 3 choose to engage the driveline brake for safety reasons or for operational reasons (ie, shutdown for the day, a storm, lunch, and/or a repair).

Both the puller 1 and the tensioner 2 will utilize their onboard plurality of sensors to determine whether their driveline brake was capable of preventing rotation of their respective reels, indicated at query 55 (FIG. 5B, puller) and 49 (FIG. 5E, tensioner) respectively. If the puller 1 detects any rotation of its reel a warning will be displayed on the puller 1 display 9, shown at 55 (FIG. 5B). If the tensioner 2 detects any rotation of its reel, a status message will be generated and transmitted via the wireless communication network 4 to the puller 1 indicating that tensioner 2 reel rotation was detected during the tensioner 2 brake check routine, shown at 54A (FIG. 5E). If no rotation was detected during the tensioner 2 brake check routine, a different status message will be generated and transmitted via the wireless communication network 4 to the puller 1 indicating that no tensioner 2 reel rotation was detected during the tensioner 2 brake check routine, shown at 54 (FIG. 5E). The puller 1 will receive the message from the tensioner 2, shown at 62 (FIG. 5B). If this message indicates the tensioner 2 detected drum rotation, a warning will be displayed on the puller 1 display 9 (FIG. 4A). The operator 3 will have the option to retry the brake check on either machine, or end the operation without the successful completion of the brake check routine, shown at 69 (FIG. 5B).

Once the brake check routine is complete, the puller 1 and tensioner 2 will then return their driveline brake and motor controller settings for motor torque and rpm to normal values (brake engaged, motor torque setting prior to the brake check, and 0.00 motor rpm), shown at 59 (FIG. 5E). Once the puller 1 and tensioner 2 have returned to normal settings, their display 9 will produce a message indicating that the brake check routine has been passed, shown at 56A (FIGS. 5B) and 73 (FIG. 5B) respectively.

Not Performing the Safety Brake Check

If the safety brake check is not desired, it may be bypassed 170 as indicated in FIG. 5A which directs an Alternate Start 160 (FIG. 5B). All of the setup operations on FIG. 5A regarding the designation of the puller and the tensioner are performed, the desired tension 72 (FIG. 5B) can be inputted and the line pull operation can progress according to FIGS. 5D and 5E.

Preparation for the Pull

Referring to FIG. 4, using the rocker buttons on the joystick 14, the operator 3 will select the desired tension (lbs-force) for the operation, shown at 72 (FIG. 5B). The microcontroller program on the puller 1 will turn this desired value into a command signal in the form of a CAN message. This message is sent to the wireless communication network 4 and transmitted to the tensioner 2, shown at 131 (FIG. 5B). The tensioner 2 will receive the command message as a desired tension (lbs-force) for operation, shown at 70 (FIG. 5F). The tensioner 2 will relay this information back to the puller 1 as a status message via the wireless communication network 4, shown at 35 (FIG. 5E). The puller 1 will receive this message and verify that the tensioner 2 received the correct value by comparing it to the original command message for desired tension (lbs.-force), shown at 81 (FIG. 5C).

The operator 3 must set the maximum line pull (lbs.-force) setting on the puller 1. This value must be slightly higher than the desired tension setting that is transmitted to the tensioner 2. The puller 1 will convert the maximum line pull setting within its microcontroller program to a value that is sent to the puller 1 motor controller for a desired amount of motor torque (Nm), shown at 78 (FIG. 5C). This is accomplished by using the calculated value for the radius of the outermost layer of pulling rope 7 on the reel and computing a required motor torque value that will meet the maximum line pull on the pulling rope 7.

The tensioner 2 will convert the desired tension input from the command message within its microcontroller program to a value that is sent to the tensioner 2 motor controller for a desired amount of motor torque (Nm), shown at 75 (FIG. 5F). This is accomplished by using the calculated value for the radius of the outermost layer of conductor 6 on the reel and computing a required motor torque value that will meet the desired line tension on the conductor 6. The tensioner 2 will then send its actual motor torque value in a status message to the puller 1 via the wireless communication network 4, shown at 35 (FIG. 5E). The puller 1 will receive this message for diagnostics purposes, shown at 39 (FIG. 5A). The puller 1 will verify that the value returned in the tensioner 2 status message is correct, shown at 81 (FIG. 5C). If the value is correct, the operator 3 may move forward with the process. If the value is not correct, the operator 3 must choose to retry the message transmission, shown at 79 (FIG. 5C), or end the operation, shown at 84 (FIG. 5C).

Releasing the Safety Brake (Driveline Brake) and Preparing to Begin the Line Pull Referring to FIGS. 5B and 5C, when the operator 3 is prepared to begin pulling in the pulling rope 7 and conductor 6, the operator 3 will select to release the driveline brake on either the puller 1, tensioner 2, or both by using the buttons on the display 9 of the puller 1, shown at 86 (FIG. 5C) and 88 (FIG. 5C) respectively.

If the operator 3 chooses to release the brake for the tensioner 2, the puller 1 will generate a command signal to instruct the tensioner 2 to release its driveline brake and then send this signal to the tensioner 2 via the wireless communication network 4, shown at 90 (FIG. 5C). The tensioner 2 will receive this command message and relay it back to the puller 1 via the wireless communication network 4, shown at 35 (FIG. 5E). The puller 1 will receive this relayed message and verify that the tensioner 2 received the correct command by comparing it to the original command, shown at 92 (FIG. 5C). If this message verifies that the tensioner 2 received the correct command, the tensioner 2 will release its driveline brake, shown at 76 (FIG. 5F). If the message is not correct, the operator 3 must choose to end operation of the present invention, shown at 95 (FIG. 5C), or continue attempting to transmit the brake release command and receive the correct response, shown at 90, 91 (FIG. 5C).

Once the tensioner 2 has released its brake, it will send a status signal to the puller 1 via the wireless communication network 4 to tell the puller 1 that the tensioner 2 brake is released, shown at 35 (FIG. 5E). The puller 1 receives this status message, shown at 39 (FIG. 5A), and displays to the operator 3 on the puller 1 display 9 that the tensioner 2 driveline brake has been released, shown at 94 (FIG. 5D).

If the operator 3 chooses to release the driveline brake on the puller 1, shown at 86 (FIG. 5C), the puller 1 will release its brake, shown at 89 (FIG. 5C), and display the released status to the operator 3 on the display 9.

Beginning the Pull

Once both the tensioner 2 and puller 1 driveline brakes are confirmed to be released, the operator 3 will use the joystick 14 located on the puller 1 to set a desired drum speed (rpm), shown at 96 (FIG. 5D). The center position of the joystick 14 indicates 0 rpm and moving the joystick 14 further away from center increases the desired speed from 0 rpm at center position to maximum rpm at maximum joystick 14 stroke. The tensioner 2 motor rpm will always be set to a desired 0 rpm. Once the puller 1 begins operation, the tensioner 2 will then send its actual motor speed as a status message to the puller 1 via the wireless communication network 4, shown at 35 (FIG. 5E). The puller 1 will receive this status message and display the tensioner 2 motor speed to the operator 3 for diagnostics purposes, shown at 39 (FIG. 5A).

Referring to FIG. 5D, at this point, the pulling rope 7 and conductor 6 begin to move through the structures 5 toward the puller 1. During this operation, the tensioner 2 will regularly send real-time data to the puller 1 as a status message, shown at 35 (FIG. 5E). This is done via the wireless communication network 4. The puller 1 will then receive these status messages and display the data to the operator 3 for diagnostics purposes, shown at 39 (FIG. 5A).

The operator 3 can then determine whether the operation is to continue, shown at query 98 (FIG. 5D) as to the puller machine. If the operation is not complete, the operator 3 will continue operating the present invention as to the puller machine. If the operation is determined to be complete, the operator 3 will set the desired reel speed to 0 rpm by moving the joystick 14 on the puller 1 to the center position, shown at 99 (FIG. 5D). The puller 1 will then set its motor rpm to 0.00 rpm, as shown in 100 (FIG. 5D).

Once the operator 3 has determined that the puller 1 and the tensioner 2 reels have come to a speed of 0 rpm by reviewing diagnostics data on the display 9, the operator 3 will select to engage the driveline brake for each machine, shown at 101 (FIG. 5D) and 103 (FIG. 5D) respectively. The puller 1 will then send a command message to the tensioner 2 via the wireless communication network 4 instructing it to engage its driveline brake, shown at 104 (FIG. 5D). The tensioner 2 will receive this message, shown at 77 (FIG. 5F), and relay it back to the puller 1 via the wireless communication network 4, shown at 35 (FIG. 5E). The puller 1 will verify that the tensioner 2 sent the correct signal by comparing it to the original command, shown at 106 (FIG. 5D). If the signal was not sent back correctly, the operator 3 must choose to end the process, shown at 109, or continue attempting to transmit the brake engage command to the tensioner 2, shown at 105 (FIG. 5D). If the signal is returned correctly, the puller 1 and the tensioner 2 will engage their driveline brakes, shown at 102 (FIG. 5D) and 80 (FIG. 5F) respectively.

The operator 3 will monitor diagnostics information to verify that the driveline brakes for both machines have been engaged. Once verified, the operator 3 will disable the "In-Command System" by pressing the corresponding button on the display 9 of the puller 1, shown at 108 (FIG. 5D). This action will end the transmission of the radio check message that the puller 1 and tensioner 2 continuously relay to each other via the wireless communication network 4, shown at 109 (FIG. 5D). When the tensioner 2 no longer receives this message, it will exit the "In-Command System" mode and will revert to standard operation mode, shown at 27, 30 (FIG. 5A).

The operator 3 will then use the system power switch 13 located on the puller 1 to turn off the system power to the puller 1, shown at 110 (FIG. 5D). The puller 1 system will then power down, shown at 111 (FIG. 5D). The observer will then use the system power switch 13 located on the tensioner 2 to turn off the power to the tensioner 2, shown at 83 (FIG. 5F). The tensioner 2 system will then power down, shown at 85 (FIG. 5F).

The conductor stringing apparatus includes a puller machine 1 which pulls a rope 7 affixed 7A to a conductor 6. The rope 6 has been at least partially guided through the above-ground supports 7B. The rope is secured to a reel on the puller machine and is wound therearound as the conductor is pulled through the supports 7B as it traverses the spans between the supports 7B.

The puller machine comprises: a frame; an onboard control system; a wireless transceiver 4 hard-wired to said onboard control system; a reel about which said rope is wound; an electric motor affixed to said frame and coupled to the reel; a safety brake; the electric motor expending electrical energy when pulling the conductor in a pulling mode. The conductor stringing apparatus also includes a tensioner machine 2 which tensions out the conductor from a reel on the tensioning machine. Tension in the rope and the conductor is created by the puller reel rotation having the rope wound therearound in combination with the application of the regenerative brake to the drivetrain of the tensioner machine. Simply put the puller machine pulls the rope/conductor while the tensioner machine holds-back or resists the paying out of the conductor from the reel of the tensioner machine. In this way, the rope and the conductor remain taut enough so as to prevent the rope and the conductor from sagging too near the ground. Keeping the rope and the conductor taut prevents interference with the ground, buildings, trees etc.

The tensioner machine comprises: a frame; an onboard control system; a wireless transceiver 4 hard-wired to said onboard control system; a reel about which the conductor is wound; an electric motor affixed to the frame and coupled to the reel; said electric motor is a regenerative brake generating electrical energy when tensioning the conductor in a tensioning mode.

The wireless transceiver of the puller machine communicates with the wireless transceiver of the tensioner machine; and, the onboard control system of the puller machine controls the onboard control system of the tensioner machine.

The puller machine includes an electro-mechanical driveline brake which is a safety brake which prevents rotation of the reel of the puller machine when engaged. The tensioner machine includes an electro-mechanical driveline brake which is a safety brake which prevents rotation of the reel of the tensioner machine when engaged.

The wireless transceiver of the tensioner machine repeats all communications from the wireless transceiver of the puller machine for verification of the communications and their accuracy. One of the important features is that a single skilled operator interfaces with the onboard control system of the puller machine. An observer interfaces with the onboard control system of the tensioner machine.

There can be multiple combinations of different types of pullers and tensioners utilized with the subject invention. A bullwheel puller, comprises: a frame; a plurality of bullwheels about which a rope is wound; having a motor selected from a group comprising of a hydraulic motor, an electric motor, or a pneumatic motor; affixed to said frame and coupled to said plurality of bullwheels; and, said motor expending energy when pulling said rope affixed to said conductor. A bullwheel tensioner, comprises: a frame; a plurality of bullwheels about which a conductor is wound; having a motor selected from a group comprising of a hydraulic motor, an electric motor, or an pneumatic motor; affixed to said frame and coupled to said plurality of bullwheels; and, said motor generating energy when tensioning out said conductor. A bullwheel tensioner, comprises: a frame; a plurality of bullwheels about which a conductor is wound; having a brake selected from a group comprising of a hydraulically operated, a pneumatically operated, or an electrically operated brake; affixed to said frame and coupled to said plurality of bullwheels; and, said brake generating energy when tensioning out said conductor. A v-groove puller, comprises: a frame; one or more v-grooves about which a rope is wound; having a motor selected from a group comprising of a hydraulic motor, an electric motor, or a pneumatic motor; affixed to said frame and coupled to said v-groove; and, said motor expending energy when pulling said rope affixed to said conductor. A v-groove tensioner, comprises: a frame; one or more v-grooves about which a conductor is wound; having a motor selected from a group comprising of a hydraulic motor, an electric motor, or an pneumatic motor; affixed to said frame and coupled to said v-grooves; and, said motor generating energy when tensioning out said conductor. A v-grooves tensioner, comprises: a frame; one or more v-grooves about which a conductor is wound; having a brake selected from a group comprising of a hydraulically operated, a pneumatically operated, or an electrically operated brake; affixed to said frame and coupled to said v-grooves; and, said brake generating energy when tensioning out said conductor.

REFERENCE NUMERALS 1 puller
1A bidirectional wireless repeater
2 tensioner
3 operator
4 radio communication network (wireless communication network)
5 structure
6 conductor
7 pulling rope
7A connection of the pulling rope 7 and the conductor 6
8 directional radio antenna
9 display
10 single axis joystick
11 battery charge level display
12 emergency stop button
13 2 position switch
14 single axis joystick
15 tension stringing process is required
16 determine whether to operate with a single operator or two operators?
17 operator activates In-Command system
18 operate with standard procedure with two operators
19 Query: is machine the puller?
20 Query: is machine the tensioner?
21 Operator selects puller option
22 Puller repeatedly transmits a radio check message
23 Operator accepts tensioner mode on puller machine menu
24 Operator selects to continue operating
25 Query: did tensioner receive radio check message?
26 Query: is radio check message returned to puller correctly?
27 Query: continue with In-Command system?
28 Tensioner sends radio check message reply
29 Puller sends message to tensioner for verification
30 End use of In-Command system
31 Tensioner receives the tensioner command
32 Query: did tensioner command message return correctly?
33 Query: continue with In-Command system?
34 Tensioner repeatedly receives command messages
35 Tensioner repeatedly sends status messages
36 Tensioner displays "In-Command Active" on display
37 Tensioner receives brake check command
38 End use of In-Command system
39 Puller repeatedly receives tensioner status messages
40 Puller repeatedly sends command message
41 Puller displays "In-Command Active" on display
42 Query: perform tensioner brake check?
43 End use of In-Command system
44 Query: perform brake check?
45 Perform tensioner brake check
46 Operator selects "Puller Brake Check"
47 Operator selects "Puller and Tensioner Brake Check"
38 Operator selects "Tensioner Brake Check"
49 Query: did tensioner reel rotate?
50 Set tensioner drum speed to 0 rpm
51 Perform Puller Brake Check
52 Puller sends message to Tensioner commanding it to perform a Brake Check
53 Operator selects to continue on Puller Display
54 Tensioner sends signal to Puller indicating it passed its Brake Check
54A Tensioner sends signal to Puller indicating it failed its Brake Check
55 Query did the Puller Reel rotate
56A Display "Puller Brake Check Passed"
57 Query: is tensioner Brake Check status correct?
58 Query: continue with In-Command system?
59 End Tensioner Brake Check routine
60 Query: check for Brake Check command
61 Puller set drum speed to 0 and engage brake
62 Puller receives Tensioner Brake Check results
63 End use of In-Command system
64 Display "Tensioner Brake Check Passed"
65 Tensioner sets drum speed to 0 rpm
66 Warning displayed on Puller display when Puller drum rotation detected during Brake Check routine
67 Query: perform Puller Brake Check again?
68 Query: did tensioner pass Brake Check?
59 Query: perform Tensioner Brake Check again?
70 Tensioner receive desired tension value 131
71 End use of In-Command system
72 Operator input of desired tension {lbs} on Puller 72A Operator input of maximum line pull {lbs} on Puller
73 Display "Tensioner Brake Check Passed"
74 Tensioner receives command 90 to release brake
75 Tensioner adjusts required motor torque if needed
76 Tensioner releases driveline brake
77 Tensioner receives command 103 to engage brake
78 Puller adjusts required motor torque if needed
79 Operator selects to continue on Puller Display
80 Tensioner engages driveline brake
81 Query: is Tensioner returning correct desired line pull?
82 Query: continue with In-Command system?
83 Operator switches off Tensioner power
84 End use of In-Command system
85 Tensioner powers down
86 Operator selects to release Puller driveline brake
87 End use of In-Command System
88 Operator selects to release Tensioner driveline brake
89 Puller releases driveline brake
90 Puller commands Tensioner to release Tensioner brake
91 Operator selects to continue on Puller Display
92 Query: is Tensioner brake status correct?
93 Query: continue with In-Command system?
94 Display "Tensioner Brake Released" on Puller Display
95 End use of In-Command system
96 Operator selects desired reel speed
97 Puller adjusts motor speed
98 Query: is operation complete?
99 Operator set desired reel speed to 0.00 rpm
100 Puller adjusts motor speed to 0.00 rpm
101 Operator selects to engage Puller driveline brake
102 Puller engages driveline brake
103 Operator selects to engage Tensioner driveline brake
104 Puller send command to Tensioner to engage brake
105 Operator selects to continue on Puller Display
106 Query: is the Tensioner brake status returned correctly?
107 Query: continue use of the In-Command system?
108 Operator disables the In-Command system
109 Puller ends transmission of radio messages
110 Operator switches off Puller power
111 Puller powers down
112 End of operation
113 line to FIG. 5B, options 46, 47 and 48
115 line to FIG. 5E, receive radio check message 25
116 line to FIG. 5C, adjust puller motor torque if required 78
117 line to FIG. 5D, display tensioner brake release on puller 94
118 line to FIG. 5F, engage tensioner driveline brake 80
119 line to FIG. 5F, receive desired tension value 70
130 operate puller
130A operate tensioner
131 send desired tension message to tensioner
160 Alternate Start
170 Bypass brake check, go to alternate start 160

While this invention has been described in conjunction with the specific embodiments outlined above, it is evident that many alternatives, modifications and variations will be apparent to those skilled in the art. Accordingly, the examples of the invention as set forth above are intended to be illustrative, and not limiting. Various changes may be made without departing from the spirit and scope of the invention.

The invention claimed is:

1. A process for tension stringing a conductor through above-ground supports, comprising the steps of:
affixing a length of rope to said conductor;
positioning a first stringing apparatus near a first end of said above-ground supports;
positioning a second stringing apparatus near a second end of said above-ground supports;
each of said first and second stringing apparatuses are powered by electric batteries;
each of said first and second stringing apparatuses includes an a respective onboard control system which controls each of said first and second stringing apparatuses in a pulling mode or in a tensioning mode;
each of said first and second stringing apparatuses includes a motor and regenerative brake;
each of said first and second stringing apparatuses includes a wireless transceiver hard-wired to said respective onboard control systems of said first and second stringing apparatuses;
selecting one of said first and second stringing apparatuses as a puller machine operating in pulling mode using said onboard control system of said selected one of said first and second stringing apparatuses designated as said puller machine;
each of said wireless transceivers communicating with the other wireless transceiver enabling control of both said first and second stringing apparatuses by said onboard control system of said puller machine;
verifying wireless communications sent from said transceiver of said puller machine were received by said transceiver of a tensioning machine and said onboard control system of said tensioning machine;
selecting and commanding said tensioning machine from said tensioning machine to operate as said tensioning machine operating in said tensioning mode, and, said puller machine being, thereafter, in command of said tensioning machine wirelessly communicating with said transceiver of said tensioning machine and controlling said onboard control system of said tensioning machine;
said puller machine in pulling mode for pulling in said conductor toward a puller machine reel and said tensioning machine being in said tensioning mode operating said regenerative brake of said tensioning machine for tensioning out said conductor from a tensioning machine reel;
said puller machine has a driveline and a driveline brake; said tensioning machine has a driveline and a driveline brake;
performing a driveline brake check on said puller machine and said tensioning machine;
providing said driveline brake check on said puller machine and said tensioning machine are satisfactory such that there is no rotation of said puller machine reel and said tensioning machine reel, an input maximum line pull value in pounds-force is input into said onboard control system of said puller machine, an input tension value in pounds-force is input into said onboard control system of said puller machine and is communicated wirelessly to said tensioning machine;
said tensioning machine operating in tensioning mode returning and acknowledging said input tension value from said puller machine operating in said pulling mode;
setting a motor speed of said tensioning machine to zero;
releasing said driveline brakes on said puller machine and said tensioning machine;
selecting a desired reel speed of said puller machine until said conductor is completely pulled through said supports; and,
if said conductor is completely pulled through said supports, simultaneously applying said driveline brakes on said puller machine and said tensioning machine as commanded by said puller machine control system on said puller machine.

2. A process for tension stringing a conductor through above-ground supports as claimed in claim 1 wherein each of said wireless transceivers of said first and second stringing apparatuses is a 1 W radio transceiver and utilizes a Yagi-Uda type or omnidirectional type antenna.

3. A process for tension stringing a conductor through above-ground supports as claimed in claim 2 wherein each of said Yagi-Uda type antennas or omnidirectional type antennas has a gain of 6 dBm.

4. A process for tension stringing a conductor through above-ground supports as claimed in claim 1 wherein each of said driveline brakes is an electro-mechanical brake which prevents rotation of said puller machine reel and said tensioner machine reel.

5. A process for tension stringing a conductor through above-ground supports as claimed in claim 1, further comprising the step of:
Interposing a bidirectional repeater between said puller machine and said tensioner machine; and,
said bidirectional repeater is comprised of a radio transceiver, an omni-directional radio antenna, and a power supply.

6. A process for tension stringing a conductor through above-ground supports as claimed in claim 1, further comprising the step of:
during application of said driveline brakes, each of:
said first and second stringing apparatuses includes a motor controller;
said motor controllers output a programmed amount of motor torque, and,
said motor controllers output a programmed motor rotations per minute.

7. A process for tension stringing a conductor through above-ground supports as claimed in claim 1, further comprising the step of:
wherein a brake force of said regenerative brake of said tensioning machine for tensioning out said conductor from said tensioning machine reel is a function of a tension pull force for said puller machine.

8. A process for tension stringing a conductor through supports using a pulling machine and a tensioning machine, said pulling machine controlling said pulling machine and said tensioning machine, comprising the steps of:
attaching a rope to said conductor, said conductor initially wound on a reel of said tensioning machine;
establishing and verifying wireless communication between a control system of said pulling machine and a control system of said tensioning machine during said tension stringing said conductor;
applying a driveline brake on said pulling machine if wireless communication between said pulling machine and said tensioning machine is not verified;
applying a driveline brake on said tensioning machine if wireless communication between said pulling machine and said tensioning machine is not verified;
said pulling machine includes a motor, a motor controller, and a reel and said tensioning machine includes a motor and a motor controller, and a reel;
checking said driveline brakes by applying torque and speed commands to said motor controllers which drive said reel on said pulling machine and said reel on said tensioning machine;
monitoring said pulling machine and said tensioning machine for movement of said reels during said checking of said driveline brakes;
inputting a desired maximum line pull force on said pulling machine control system; inputting a desired tension force on said pulling machine control system;
communicating said desired tension force on said pulling machine control system to said tensioning machine control system on said tensioning machine;
said tensioning machine generating a tensioning force based on said desired tension force of said pulling machine using a regenerative brake of said tensioning machine; and,
pulling said rope and said conductor through said supports with said pulling machine.

9. A process for tension stringing a conductor through supports using a pulling machine and a tensioning machine, said pulling machine controlling said pulling machine and said tensioning machine as claimed in claim 8, further comprising the steps of:
said tensioning force is calculated based on the weight of the rope and the conductor used, the friction load generated as the rope and the conductor are pulled through the supports, the terrain that the supports, rope and conductor traverse, a horizontal load, a vertical load, and the distance between said pulling machine and said tensioning machine.

10. A process for tension stringing a conductor through supports using a pulling machine and a tensioning machine, said pulling machine controlling said pulling machine and said tensioning machine as claimed in claim 8, wherein said pulling machine and said tensioning machine each includes a frame; an electric motor affixed to each of said frames and coupled to each of said reels;
and, each said electric motor expending electrical energy when in a pulling mode and pulling in said rope affixed to said conductor, alternatively, each said electric motor generating electrical energy when tensioning said conductor out in tensioning mode.

11. A process for tension stringing a conductor through supports using a pulling machine and a tensioning machine, said pulling machine controlling said pulling machine and said tensioning machine as claimed in claim 10, wherein each of said pulling machine and said tensioning machine includes:
each of said motor controllers in combination with a respective one of said electric motors; said control systems switchable between a pulling mode and a tensioning mode; said control systems outputting commands to said one of said motor controllers for control of said respective one of said electric motors; a plurality of batteries; said control systems and said motor controllers applying electrical energy from said batteries to one of said respective electric motors when in said pulling mode; said control systems and said motor controllers applying electrical energy generated by one of said electric motors to said plurality of batteries when in said tensioning mode; said control systems controlling electric motor torque and speed and said control systems controlling torque in said pulling mode; and, said control systems and said respective motor controllers controlling electric motor torque in said tensioning mode.

12. A process for tension stringing a conductor through supports using a pulling machine and a tensioning machine, said pulling machine controlling said pulling machine and said tensioning machine as claimed in claim 8, further comprising the steps of:
said supports are located underground.

13. A process for tension stringing a conductor through supports, comprising the steps of:
affixing a length of rope to said conductor;
positioning a first stringing apparatus near a first end of said supports;
positioning a second stringing apparatus near a second end of said supports;
each of said first and second stringing apparatuses are powered by sources selected from the group consisting of electric batteries, diesel powered electric over hydraulic system, and electric over hydraulic system;
each of said first and second stringing apparatuses includes an onboard control system which controls each of said first and second stringing apparatuses in pulling mode or in tensioning mode;
each of said first and second stringing apparatuses includes a brake selected from the group consisting of a motor and a regenerative brake, a hydraulic circuit, and a hydraulically applied brake;
each of said first and second stringing apparatuses includes a wireless transceiver which is hard-wired to said onboard control system;
establishing and verifying wireless communication between said first and second stringing apparatuses;
initiating operation of said onboard control systems of each of said first and second stringing apparatuses wherein each of said first and second stringing apparatuses includes a display enabling activation of an "In-Command" operating system wherein one of said first and second apparatuses is exclusively selected to operate-in-said pulling mode and the apparatus not selected to operate in said pulling mode is in said tensioning mode;
said one of said apparatuses selected to operate in said pulling mode is a pulling machine and the apparatus not selected to operate in said pulling mode is in said tensioning mode and is a tensioning machine;
each of said wireless transceivers communicating with the other wireless transceiver enabling control of both said pulling machine and said tensioning machine by said onboard control system of said pulling machine;
verifying said wireless communications sent from said transceiver of said pulling machine were received by said transceiver of said tensioning machine and said onboard control system of said tensioning machine;
selecting and commanding said tensioning machine from said tensioning machine to operate as said tensioning machine in tensioning mode, said pulling machine being, thereafter, in command of said tensioning machine wirelessly communicating with said transceiver of said tensioning machine and controlling said onboard control system of said tensioning machine;
said pulling machine in pulling mode for pulling in said rope affixed to said conductor and said tensioning machine being in said tensioning mode operating said regenerative brake of said tensioning machine for tensioning out said conductor from a reel of said tensioning machine reel;
performing a driveline brake check on said pulling machine and said tensioning machine;
providing said driveline brake check on said pulling machine and said tensioning machine are satisfactory such that there is no rotation of reel a pulling machine reel and said tensioning machine reel, an input maximum line pull value in pounds-force is input into said onboard control system of said pulling machine, a desired tension value in pounds-force is input into said onboard control system and is communicated wirelessly to said tensioning machine;
said tensioning machine operating in tensioning mode returning and acknowledging said input desired tension value from said pulling machine operating in said pulling mode;
setting a tensioning machine motor speed to zero;
releasing said driveline brakes on said pulling machine and said tensioning machine;
selecting a desired reel speed of said pulling machine; pulling said rope and said conductor until said conductor is completely pulled through said supports; and,
if said conductor is completely pulled through said supports, simultaneously applying said driveline brakes on said pulling machine and said tensioning machine as commanded by said-pulling machine onboard control system on said pulling machine.

14. A process for tension stringing a conductor through supports as claimed in claim 13, further comprising the steps of:
adjusting a tensioner motor torque of said tensioning machine creating a braking force on said reel of said tensioner while said rope and said conductor are being pulled through said supports when said motor and a regenerative brake is selected; and,
adjusting said hydraulic circuit creating a braking force on said reel of said tensioner while said rope and said conductor are being pulled through said supports when said hydraulic circuit is selected; and,
adjusting said hydraulically applied brake creating a braking force on said reel of said tensioner while said rope and said conductor are being pulled through said supports when said hydraulically applied brake is selected.

15. A process for tension stringing a conductor through supports using a pulling machine and a tensioning machine, said pulling machine controlling said pulling machine and said tensioning machine, comprising the steps of:
attaching a rope to said conductor, said conductor initially wound on a reel of said tensioning machine;
establishing and verifying wireless communication between a control system of said pulling machine and a control system of said tensioning machine during said tension stringing of said conductor;
applying a driveline brake on said pulling machine if wireless communication between said pulling machine and said tensioning machine is not verified;
applying a driveline brake on said tensioning machine if wireless communication between said pulling machine and said tensioning machine is not verified;
checking said driveline brakes by applying torque and speed commands to: a motor controller of said tensioning machine and to a motor controller of said pulling machine said motor controller of said pulling machine drives a respective reel on said pulling machine and said motor controller of said tensioning machine drives said respective reel on said tensioning machine;
monitoring said pulling machine and said tensioning machine for movement of said reels during said checking of said driveline brakes;
inputting a desired maximum line pull force on said pulling machine control system;
inputting a desired tension force on said pulling machine control system;

communicating said desired tension force on said pulling control system to said tensioning machine control system on said tensioning machine;

said tensioning machine generating a tensioning force based on said desired tension force of said pulling machine using a brake selected from the group consisting of a regenerative brake, hydraulic circuit, and a hydraulic brake of said tensioning machine; and, pulling said rope and said conductor through said supports with said pulling machine.

16. A process for tension stringing a conductor through supports using a pulling machine and a tensioning machine, said pulling machine controlling said pulling machine and said tensioning machine as claimed in claim 15, further comprising the steps of:

said supports are located underground.

17. A process for tension stringing a conductor through supports using a pulling machine and a tensioning machine, said pulling machine controlling said pulling machine and said ten sioning machine, comprising the steps of:

affixing a length of rope to said conductor;

positioning a first stringing apparatus near a first end of said supports;

positioning a second stringing apparatus near a second end of said supports;

each of said first and second stringing apparatuses are powered by sources selected from the group consisting of electric batteries, diesel powered electric over hydraulic system, and electric over hydraulic system;

each of said first and second stringing apparatuses includes an onboard control system which controls each of said first and second stringing apparatuses in pulling mode or in tensioning mode;

each of said first and second stringing apparatuses includes a brake selected from the group of a regenerative brake, hydraulic circuit, and a hydraulically operated brake;

each of said first and second stringing apparatuses includes a wireless transceiver which is hard-wired to said onboard control system;

establishing and verifying, using said wireless transceivers, wireless communication between said first and second stringing apparatuses;

initiating operation of said onboard control systems of each of said first and second stringing apparatuses wherein each of said first and second stringing includes a display enabling activation of an "In-Command" operating system wherein one of said first and second apparatuses exclusively selected to operate said pulling mode and the apparatus not selected to operate in said pulling mode is in said tensioning mode;

each of said wireless transceivers communicating with the other wireless transceiver enabling control of both said pulling machine and said tensioning machine machines by said onboard control system of said puller pulling machine;

verifying, using said wireless transceivers, that said wireless communications sent from said wireless transceiver of said pulling machine were received by said wireless transceiver of said tensioning machine and said onboard control system of said tensioning machine;

selecting and commanding said tensioning machine from said tensioning machine to operate as said tensioning machine in tensioning mode, said puller machine being, thereafter, in command of said tensioning machine wirelessly communicating with said transceiver of said tensioning machine and controlling said onboard control system of said tensioning machine;

said pulling machine in pulling mode for pulling in said rope affixed to said conductor and a tensioning machine being in said tensioning mode operating said brake selected from the group of a regenerative brake, a hydraulic circuit, and a hydraulic brake of said tension machine for tensioning out said conductor a reel of said tensioning machine;

inputting a desired maximum line pull force on said pulling machine control system;

inputting a desired tension force on said pulling machine control system;

communicating said desired tension force on said pulling control system to said tensioning machine control system on said tensioning machine;

said tensioning machine generating a tensioning force based on said desired tension force of said pulling machine using said brake; and, pulling said rope and said conductor through said supports with said pulling machine.

18. A process for tension stringing a conductor through supports using a pulling machine and a tensioning machine, said pulling machine controlling said pulling machine and said tensioning machine as claimed in claim 17, further comprising the steps of:

said supports are located underground.

* * * * *

UNITED STATES PATENT AND TRADEMARK OFFICE
CERTIFICATE OF CORRECTION

| | | |
|---|---|---|
| PATENT NO. | : 12,244,131 B2 | Page 1 of 1 |
| APPLICATION NO. | : 16/814897 | |
| DATED | : March 4, 2025 | |
| INVENTOR(S) | : Cody Glenn Jackson, John Jerry Martin and Andrew Calvin Lackman | |

It is certified that error appears in the above-identified patent and that said Letters Patent is hereby corrected as shown below:

In the Claims

Claim 13, Column 21, Line 66, after "rotation of" delete "reel a" and insert --said-- therefor.

Signed and Sealed this
Fourteenth Day of October, 2025

John A. Squires
*Director of the United States Patent and Trademark Office*